United States Patent Office 3,256,246
Patented June 14, 1966

3,256,246
COPOLYMERIZATION OF TRIOXANE WITH PRE-FORMED LINEAR POLYMERS
Klemens Gutweiler, Mainz (Rhine), and Edgar Fischer, Klaus Küllmar, and Gerhard Bier, Frankfurt am Main, Germany, assignors to Farbwerke Hoechst Aktiengesellschaft vormals Meister Lucius & Brüning, Frankfurt am Main, Germany, a corporation of Germany
No Drawing. Filed Oct. 23, 1962, Ser. No. 232,572
Claims priority, application Germany, Oct. 27, 1961, F 35,229
4 Claims. (Cl. 260—67)

The present invention relates to a process for the manufacture of copolymers of trioxane.

It is known that under certain conditions trioxane can be converted into products of high molecular weight which are highly crystalline, like polyformaldehyde obtained by polymerizing formaldehyde, and which can be processed in the thermoplastic state after having been stabilized. While formaldehyde can be copolymerized with very few other compounds only, trioxane is capable of being copolymerized with a considerably greater number of compounds, for example cyclic ethers and acetals.

Depending on their character and the amount of comonomer used, the trioxane copolymers have other properties than trioxane homopolymers, for example a greater toughness, a lower degree of crystallinity, better clarity, lower melting point, or greater thermostability.

The present invention provides a novel process for the manufacture of copolymers of trioxane, especially copolymers containing a high proportion of trioxane. In addition to $-(CH_2-O-CH_2-O-CH_2-)_n-$ groupings the copolymers contain other structural units which are defined below. The process of the invention permits the incorporation of structural units into the polymer chain which could hitherto not be incorporated by known polymerization processes.

Still further, copolymers can be built up from structural units which are contained in known copolymers. However, in the copolymers made by the process of the invention the comonomer or comonomers are distributed in a different order. It is possible, for example, to produce block polymers or copolymers having a higher molecular weight than copolymers made by known methods.

In many cases the process of the invention offers industrial advantages.

In the process of the invention monomeric trioxane is reacted in the presence of one or several primary polymers, for example high molecular weight polyethers, preferably high molecular weight polyacetals and/or polyacetal ethers, under conditions under which trioxane itself forms products of high molecular weight. In general for one mol of primary polymer one third of a mol to 2,000 mols of trioxane are used.

The primary polymers to be used in the process of the invention can be prepared, for example, by polymerizing with themselves cyclic acetals having the following formula

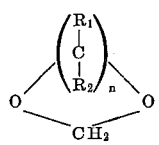

in which $n$ stands for a whole number in the range of 2 to 5, the chain $(C)_n$ may contain unsaturated linkages, and $R_1$ and $R_2$ represent hydrogen or a substituted or unsubstituted, preferably halogen- and more preferably chlorine-substituted, alkyl radical having 1 to 10 carbon atoms. Still further, the primary polymers to be used can be prepared by polycondensing diols in which the hydroxyl groups are so remote from one another that they form linear polycondensation products with formaldehyde, rather than cyclic acetals. Suitable diols for making the above-mentioned linear polycondensates are, for example, hexane-diol-1,6, decane-diol-1,10, quinitol, a compound of the following formula:

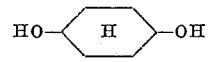

or 1,4-cyclohexane-dimethanol, a compound of the formula

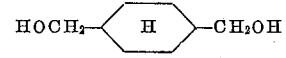

The primary polymers to be used can also be obtained by reacting compounds of the formula $$HO-(CH_2CH_2-O)_nCH_2CH_2OH$$

in which $n$ is a whole number of at least 2 and preferably in the range of 2 to 100, with formaldehyde, or by polymerizing cyclic ether-acetals, for example diethylene glycol formal either alone or with trioxane. The primary polymers to be used can be produced, for example, according to the processes described in Patent No. 2,202/60 of the Union of South Africa, U.S. Patents Nos. 2,394,910 or 2,968,646, or British Patent No. 886,982.

Experiments have revealed that the added primary polymers or fractions thereof are incorporated into the novel polymer. When, for example, 10 parts of a copolymer of 37 parts by weight of ethylene glycol formal and 15 parts by weight of trioxane are dissolved in 90 parts by weight of liquid trioxane and the solution is polymerized, there is obtained a crystalline polymer in which the incorporated $(CH_2-CH_2-O)$ units can be detected.

The primary polymer contains oxygen bridges in the macromolecule and under the polymerization conditions the macromolecules are attacked and larger or smaller fractions thereof are incorporated into the novel copolymer. It can be assumed that the incorporation takes place according to the following scheme (this not being intended to constitute a limitation of the invention).

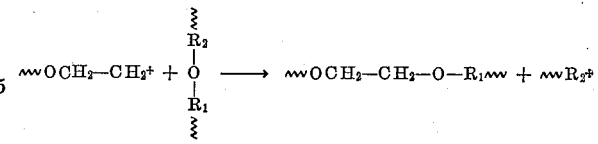

It is understandable that the number of oxygen atoms contained in the chain of the macromolecule and their stability or instability to the attacking ion is a characteristic feature in the copolymerization. Polyethers appear to be more stable than polyacetals or polyether acetals. Therefore, polyacetals or polyether acetals are easier to incorporate than polyethers. If the primary polymer contains oxygen bridges which are very difficultly attacked under conditions suitable for the polymerization of trioxane, final products can be obtained in which only part of the primary polymer is bound while the other part is unchanged. The properties of the copolymers prepared by the process of the invention distinctly differ from those of a blend of the primary polymer with polytrioxane.

By the process of the invention there can also be incorporated into a polyoxymethylene chain linear or branched bivalent radicals of saturated or unsaturated aliphatic hydrocarbons, for example radicals having the following structure

or

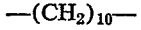

or

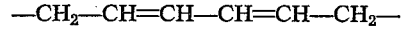

Diols of the formulae:

or
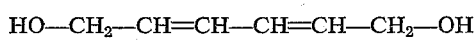

do not form polymerizable cyclic formals with formaldehyde. However, diols of the aforementioned type can be incorporated into a polyoxymethylene chain by the process of the invention in the form of their linear polyformals as easily obtained by polycondensation of the said diols with formaldehyde.

The process of the invention also permits the incorporation of, for example, structural units of the following formula:

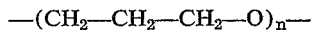

in which $n$ is a whole number in the range of 2 to 100 by copolymerizing polytetrahydrofurane or a primary formal, obtained by polycondensation of a diol of the following formula

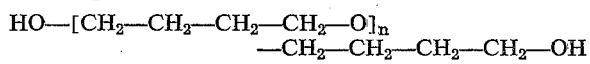

with formaldehyde, with trioxane in the presence of a polymerization catalyst. Alternatively, there can be incorporated into the polyoxymethylene chain bivalent radicals of araliphatic hydrocarbons, for example the radical

or bivalent radicals of cycloaliphatic hydrocarbons, for example the radical

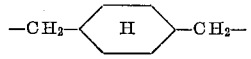

by copolymerizing polyformals which contain units of the aforesaid structures with trioxane.

The process of the invention offers the following advantages:

It is known that when a comonomer is added to trioxane the inhibition period in the polymerization may be strongly increased. This extension of the inhibition period, which depends on the amount of comonomer added, is especially disadvantageous in a polymerization carried out in continuous manner. An increase of the polymerization temperature and of the amount of catalyst used my counteract the prolongation of the inhibition period, but steps of this kind affect the quality of the product obtained. As compared therewith, the polymerization according to the invention sets in at once independent of the amount of primary polymer added and with a normal amount of catalyst so that a detrimental increase of the polymerization temperature and of the amount of catalyst is not necessary.

Since the primary polymers used are soluble in trioxane to a large extent, trioxane copolymers which contain a very high proportion of comonomer component can be produced. By the process of the invention a trioxane copolymer having a high proportion of ethylene oxide units is much easier to produce than by direct copolymerization of trioxane with ethylene oxide because in the latter case an autoclave is required.

As already mentioned, a substantial advantage of the process of the invention resides in that components which are not capable of being copolymerized with trioxane but which can be condensed with formaldehyde to polymers having the general Formula I defined below can be incorporated into the polyoxymethylene chain provided that said polymers are soluble in trioxane.

A further advantage is the fact that the polymerization can be carried out as polymerization in the solid phase.

It has already been proposed to polymerize solid trioxane in simple manner at a temperature below the melting point by the so-called solid polymerization after having charged the trioxane crystals with the catalyst, for example $BF_3$ gas. Experiments to carry out the copolymerization in the solid phase did not lead to satisfactory results. The comonomer adheres to the surface of the trioxane crystals, agglutinates the crystals and very non-uniform copolymers are obtained which often contain only a small proportion of incorporated comonomer. Moreover, the polymers thus obtained do not have the same thermostability as copolymers from the same monomers prepared by a process carried out in the liquid phase, for example with molten trioxane. In the copolymerization of solid trioxane with ethylene oxide the latter adheres to the surface of the trioxane crystals and causes a considerable prolongation of the inhibition period.

With the use of primary polymers as copolymerization components these disadvantages are substantially avoided. The components are considerably better incorporated than in the copolymerization of trioxane with a monomeric cyclic ether or acetal. The products obtained have approximately the same thermostability as products produced by polymerizing a solution of the primary polymer in liquid trioxane but a considerably higher molecular weight.

The primary polymers added to trioxane in the process of the invention may be composed of structural units having the general formula

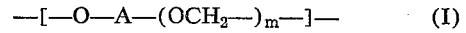    (I)

in which A is a substituted or unsubstituted bivalent radical of a hydrocarbon which may be interrupted by heteroatoms, for example O, S, N, P or Si, preferably O or S and $m$ is zero or a whole number in the range of 1 to 20, preferably 1 to 10.

The radical A can have the following formula

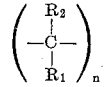

in which $n$ stands for a whole number in the range of 2 to 20, preferably 2 to 10 and $R_1$ and $R_2$ are identical or different and represent hydrogen atoms or monovalent organic radicals, for example an alkyl radical having 1–9 carbon atoms, a cycloalkyl radical, for example the cyclohexyl radical, or a halogen- and preferably chlorine-substituted alkyl or cycloalkyl radical. A may represent, for example the ethylene, propylene, i-propylene, butylene, i-butylene, cyclohexylene radical or a chloromethyl-ethylene radical.

The radical A can also have the following formula

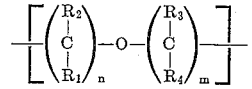

in which $n$ and $m$ stand for identical or different whole numbers in the range of 2 to 10 and preferably 2 to 4, and the radicals $R_1$, $R_2$, $R_3$, and $R_4$ are identical or different and represent hydrogen atoms or monovalent organic radicals, for example an alkyl radical having 1 to 9 carbon atoms, a cycloalkyl radical, for example the cyclohexyl radical, or a halogen- and preferably chlorine-substituted alkyl or cycloalkyl radical. In the simplest case A stands for a diethylene oxide radical.

Still further A can have the following formula:

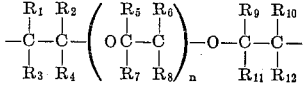

in which $n$ is a whole number in the range of 1 to 100 and the radicals $R_1$–$R_{12}$, which may be identical or different, represent hydrogen atoms, or a monovalent organic radical such as an alkyl radical having for example 1–9 atoms, a cycloalkyl radical, for example the cyclohexyl radical, or a halogen- and preferably a chlorine-substituted alkyl or cycloalkyl radical. In the simplest case when $R_1$–$R_{12}$ stand for hydrogen atoms A has the structure of a polyethylene oxide.

The copolymerization according to the invention of trioxane with the primary polymers described above can be carried out in various ways.

(1) The primary polymer to be added to the trioxane is prepared by polymerizing monomers. By a suitable selection of the monomers and of their proportions, crystalline or amorphous polymers are obtained. In the copolymerization with trioxane there are preferably used such primary polymers as are soluble in liquid trioxane. They can be stirred into liquid trioxane together with the catalyst still contained therein from the polymerization. The primary polymer dissolves in the trioxane, forms a limpid and viscous solution and the polymerization sets in at once. This mode of execution is especially suitable for continuous polymerization of liquid trioxane. The high molecular weight primary polymer containing the catalyst is metered in the reactor by means of a dosing device simultaneously with the liquid trioxane.

(2) The primary polymer is prepared, isolated in pure state and the solid polymer which is free from catalyst is dissolved in liquid trioxane.

The solution can be polymerized in the reactor while the catalyst is metered in. This mode of operation is well suited to a continuous process.

(3) The isolated and catalyst-free primary polymers are dissolved in liquid trioxane, and the solution is cooled so that it crystallizes. The crystals are charged with boron trifluoride gas. On heating the crystals charged with boron trifluoride gas, for example at 50° C., solid phase polymerization sets in.

For initiating the polymerization of trioxane with a primary polymer according to the invention Lewis acids are especially suitable, that is compounds which are capable of taking up one or several pairs of electrons in an open outer shell of one of their atoms (cf. Kortüm, Lehrbuch der Elektrochemie, Wiesbaden, 1948, pages 300–301).

Among the large number of inorganic compounds active as polymerization catalysts there may be mentioned, for example, $BCl_3$, $AlCl_3$, $FeCl_3$, $SbCl_3$, $SbCl_5$, $ZnCl_2$, $SnCl_4$, $TiCl_4$ and preferably $BF_3$.

For initiating the polymerization of the invention there can preferably be used also the complex compounds of Lewis acids, advantageously of $BF_3$, with ethers or amines for example the complex compounds of Boron trifluoride with dimethyl ether,
Boron trifluoride with methylethyl ether,
Boron trifluoride with diethyl ether,
Boron trifluoride with di-isoamyl ether,
Boron trifluoride with tetrahydrofurane,
Boron trifluoride with tetrahydropyrane
Boron trifluoride with diethyl thioether.

Catalysts having a good activity are also salts of Lewis acids, preferably of $BF_3$, for example the oxonium salts.

Further suitable catalysts are the complex compounds of Lewis acids with inorganic acids, for example hydrofluoboric acid. Highly active and of great industrial importance are aryldiazonium salts, especially those having an anion of large volume such as $BF_4^-$, $ClO_4^-$, and $PF_6^-$ which are easily synthesized by classic synthetic methods and which can be modified to a large extent. The special advantage of this class of catalysts is that the aryldiazonium salts have a different disintegrability depending on their structure and that it is thus possible to select a specific catalyst for each case. There exist, for example, aryldiazonium fluoborates which thermally disintegrate under the polymerization conditions of the present process; others, however, only disintegrate under the same conditions in the presence of light, for example normal sunlight or the light of a mercury vapor lamp, and then initiate the polymerization.

There may be specifically mentioned the following diazonium salts:

(a) Light active diazonium salts:

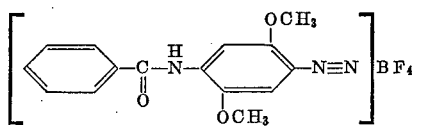

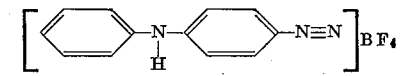

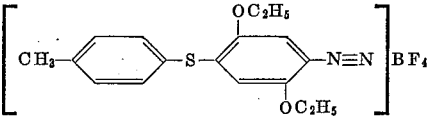

(b) Thermo-active diazonium salts which can simultaneously be activated by light

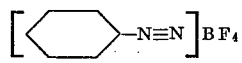

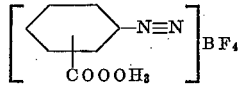

the radical —$COOCH_3$ being in ortho, meta or para position.

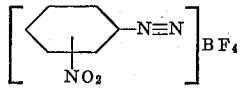

the —$NO_2$ group being in ortho, meta or para position.

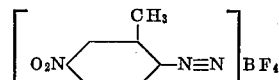

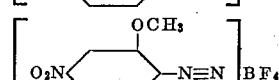

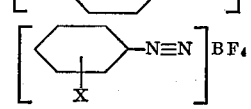

X representing halogen, preferably F or Cl in ortho, meta or para position.

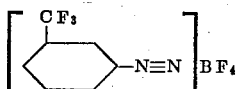

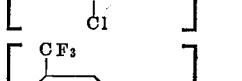

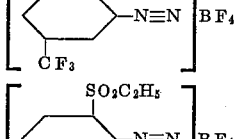

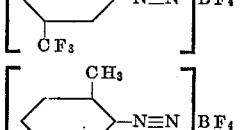

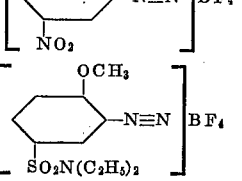

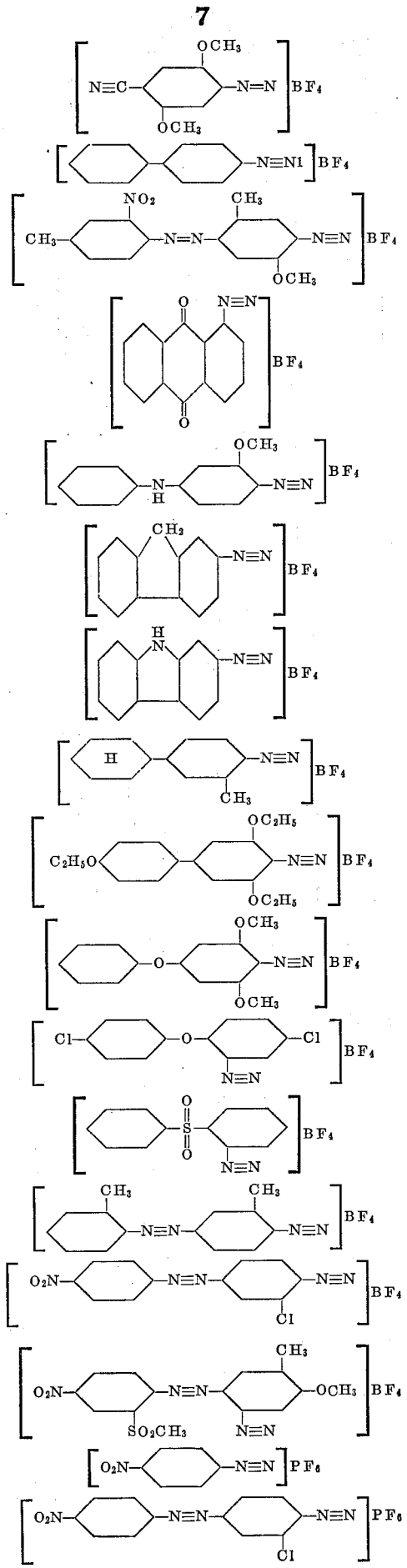

The polymerization temperature can vary within wide limits in the range of about −100° C. to +150° C. depending on the polymerization process. In general polymerization temperatures in the range of −70° C. to +110° C. are used, polymerization in the solid phase being carried out at a temperature in the range of 20 to 70° C. and polymerization in liquid trioxane being carried out at a temperature ranging from 60 to 100° C.

In the polymerization of trioxane, substances containing active hydrogen, for example $H_2O$, alcohols, phenols, carboxylic acids and carbonyl compounds, have a disturbing action and it is, therefore, preferable to maintain the content of such substances as low as possible. The polymers added should, therefore, contain not too many groups with active hydrogen. In many cases the disturbances can be overcome in simple manner. The addition of 10% of triethylene glycol, for example, strongly impairs the polymerization of trioxane. If, however, the triethylene glycol is first reacted to form a formal of high molecular weight this product does not disturb the trioxane polymerization and the copolymer obtained contains $(CH_2CH_2O)_3$ groups.

The copolymers made by the process of the invention from trioxane and a polymer dissolved therein and having the general Formula I are thermostable and can be processed in the thermoplastic state into foils, films, ribbons, textile fibers and various injection-molded articles. They are mostly crystalline. It is likewise possible, however, to produce products which are amorphous or have a low degree of crystallinity and which are suitable for the manufacture of, for example, products having rubber-like properties, adhesives or thickening agents.

For improving their stability the polymers can be subjected to an after-treatment as described, for example, in Belgian Patent 617,897. In general it is of advantage to add to the polymers heat stabilizers, oxidation inhibitors or light protecting agents.

The following examples serve to illustrate the invention but they are not intended to limit it thereto.

*Example 1*

1 cc. of a dilute $BF_3$-dibutyl ether complex compound solution, obtained by diluting 1 part of the complex compound of $BF_3$ and dibutyl ether with 10 parts of dibutyl ether, was added to 37 grams of ethylene glycol formal and the mixture was polymerized at 70° C. After one hour a limpid mass was obtained which was highly viscous at said temperature.

Varying proportions of said primary polymer which still contained the polymerization catalyst were dissolved in liquid trioxane. After solution of the polymer the polymerization set in at once. The resulting polymer mixtures were ground and boiled in methanol containing 1% of ethanolamine for inactivating the catalyst. The polymers were dried at 70° C. and heated without further stabilization for 30 minutes at 220° C. in order to determine the thermal degradation.

The results are recited in the following table:

| Grams of primary polymer for 100 grams of trioxane | Loss in weight during thermal treatment, percent by weight |
| --- | --- |
| 0 | 49.4 |
| 2 | 12.6 |
| 3 | 10.0 |
| 5 | 6.3 |

Example 2

A mixture of 37 grams of ethylene glycol formal, 15 grams of trioxane and 1 cc. of dilute $BF_3$-dibutyl ether solution was copolymerized at 70° C. After having polymerized for one hour, varying amounts of the limpid, highly viscous mass obtained were added to 100 grams each of liquid trioxane. The primary polymer dissolved on shaking and the polymerization of the solution set in at once.

The polymerization mixtures were processed as described in Example 1 and the thermal stability was determined as defined above. The following results were obtained:

| Grams of primary polymer for 100 grams of trioxane | Loss in weight during thermal treatment, percent by weight |
|---|---|
| 4.5 | 6.7 |
| 6 | 5.8+ |
| 10 | 4.1 |

Example 3

37 grams of ethylene glycol formal and 30 grams of trioxane were polymerized at 70° C. with 0.45 cc. of the dilute solution of the $BF_3$-dibutyl ether compound defined in Example 1. Varying amounts of the primary polymer obtained, which was limpid and highly viscous at the polymerization temperature, were dissolved in 100 grams each of liquid trioxane. In order to obtain batches each containing the same amount of catalyst, that is 0.1 cc. of the dilute solution of $BF_3$-dibutyl ether complex compound, the deficiency of dibutyl ether solution was added to each batch together with the primary polymer. The polymers obtained were processed as described in Example 1.

| Grams of primary polymer for 100 grams of trioxane | Cc. of dilute $BF_3$-ether complex solution | Loss in weight during thermal treatment, percent by weight |
|---|---|---|
| 6 | 0.06 | 7.3 |
| 9 | 0.04 | 5.6 |
| 15 | 0 | 3.3 |

Example 4

The primary polymer was prepared by polymerizing 37 grams of ethylene glycol formal with 45 grams of trioxane and 0.45 cc. of the dilute $BF_3$-dibutyl ether complex compound solution defined in Example 1. The polymer obtained was polymerized and processed as described in Example 3.

| Grams of primary polymer for 100 grams of trioxane | Cc. of dilute $BF_3$-ether complex solution | Loss in weight during thermal treatment, percent by weight |
|---|---|---|
| 7.5 | 0.06 | 8.6 |
| 11 | 0.04 | 6.8 |
| 18 | 0 | 3.5 |

Example 5

A freshly prepared highly viscous primary polymer made from 37 grams of ethylene glycol formal and 45 grams of trioxane was stirred into methanol containing ethanolamine. A solid polymer precipitated which was washed with methanol until the washing liquid was neutral. The polymer was then dried at 50° C. in a vacuum drier over phosphorus pentoxide. The following analytical data were found: C, 43.6%; H, 7.4%.

18 grams of the dried polymer were dissolved in 100 grams of liquid trioxane and the polymerization was initiated with 10 milligrams of para-nitrophenyl diazonium fluoborate. The inhibition period was not extended in contradiction to a comparative polymerization of trioxane with ethylene oxide. The polymerization mixture was processed as described in Example 1. When heated for 30 minutes at 220° C. the copolymer lost 4% of its weight.

Example 6

18 grams of the primary polymer of Example 5 which had been freed from catalyst and dried were dissolved in 100 grams of liquid trioxane and the mixture was allowed to crystallize in a polypropylene bag. By repeatedly kneading the crystal block the product was obtained in the form of fine crystals. The crystals in the bag were charged with 5 cc. of $BF_3$ gas and the bag was put in an oil bath at 70° C. The polymerization set in at a temperature below the melting point and the batch polymerized without melting of the crystals. The solid polymer obtained was processed as described in Example 1. When heated for 30 minutes at 220° C. the polymer lost 3.3% of its weight.

Example 7

Butanol-1-thiol-4, $HO(CH_2)_4SH$, was polycondensed with formaldehyde in the presence of para-toluene sulfonic acid as catalyst to yield a linear polyformal. In order to remove the catalyst the polyformal was dissolved in ethylene chloride and the solution was stirred into ammonical methanol. The precipitated polyformal was repeatedly dissolved in ethylene chloride until it no longer gave an alkaline reaction and was then precipitated by stirring it into methanol. The polyformal was then dried in a rotary evaporator.

5 grams of the resinous polyformal were dissolved in 100 grams of trioxane and the solution was polymerized in usual manner. The ground crude polymer was dissolved at 160° C. in a mixture of 10 parts by weight of benzyl alcohol and 0.5 part by weight of triethanolamine, calculated on the weight of crude polymer, and subjected to alkaline degradation for one hour at said temperature. After the solution had cooled, the degraded polymer was filtered off, boiled three times with methanol and dried. The crude polymer lost 30% of its weight.

5 grams of the degraded polymer were stabilized with 10 milligrams of dicyanodiamide and 35 milligrams of 2,2-methylene - bis - (4 - methyl - 6 - tert. - butyl phenol) and subjected to thermal degradation for 45 minutes at 230° C. The polymer lost 0.06% of its weight per minute.

Example 8

Quinitol

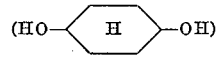

was polycondensed with paraformaldehyde in the presence of para-toluene sulfonic acid as catalyst. 6 grams of the purified polyformal were dissolved in 100 grams of trioxane and the solution was polymerized.

The crude polymer was subjected to alkaline degradation as described in Example 7. The thermostability of the degraded product thus obtained was determined.

In the alkaline degradation the crude polymer lost 25% of its weight and in the thermal degradation it lost 0.02% of its weight per minute.

Example 9

A polycondensation product was prepared from hexanediol - 1,6 $[HO(CH_2)_6OH]$ and paraformaldehyde. Varying amounts of the purified polyformal were dissolved in trioxane and the solutions were polymerized. The crude polymers were subjected to alkaline degradation as described in Example 7 and the thermostability of the decomposed polymers was tested.

(a) 6 grams of polyformal were dissolved in 100 grams of trioxane. Total loss of crude polymer in alkaline degradation=20%, loss in weight in thermal degradation 0.007% per minute.

(b) 12 grams of polyformal were dissolved in 100 grams of trioxane. Total loss of crude polymer in alkaline degradation=18%, loss in weight in thermal decomposition 0.0013% per minute.

*Example 10*

Triethylene glycol $$(HOCH_2CH_2OCH_2CH_2OCH_2CH_2OH)$$

was polycondensed with paraformaldehyde in the presence of para-toluene sulfonic acid as catalyst. The polyformal obtained was copolymerized with trioxane without having been processed and purified. 12 grams of polyformal were dissolved in 100 grams of trioxane and the solution was polymerized. The crude polymer was subjected to alkaline degradation as described in Example 7 and the thermostability of the decomposed product was tested.

Loss in weight of crude polymer in alkaline degradation 25%, loss in weight in thermal degradation 0.013% per minute.

*Example 11*

Cyclohexane-dimethanol

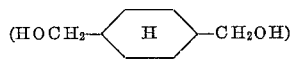

was polycondensed with paraformaldehyde in the presence of paratoluene-sulfonic acid. Without having been further processed and purified the polyformal obtained was copolymerized with trioxane as described above. The crude polymers obtained were subjected to alkaline degradation as described in Example 7 and the thermostability of the decomposed products was tested.

(a) 7.5 grams of polyformal were dissolved in 100 grams of trioxane.

Loss in weight of crude polymer in alkaline degradation 35%, loss in weight in thermal degradation 0.02% per minute.

(b) 12 grams of polyformal were dissolved in 100 grams of trioxane.

Loss in weight of crude polymer in alkaline degradation 22%, loss in weight in thermal degradation 0.015% per minute.

*Example 12*

45 grams of butane-diol-1,4 were polycondensed with 18 grams of paraformaldehyde in the presence of 0.5 cc. of hydrofluoboric acid of 40% strength. The polycondensation product obtained was dissolved in benzene and the solution was shaken first with water containing a little ethanolamine and then with pure water until the reaction was neutral.

The benzene was removed under reduced pressure and the limpid and colorless condensation product was freed from the last traces of water and benzene in a vacuum drier. 4 grams of the condensation product were dissolved in 100 grams of trioxane and the solution was polymerized with the addition of 0.01 cc. of the complex compound of $BF_3$ with dibutyl ether. The copolymer obtained was processed as described in Example 1. The thermal stability was determined as described in Example 1. The product lost 4.4% of its weight.

*Example 13*

51 grams of cyclic butane-diol-1.4-formal were polymerized at 70° C. with 90 grams of trioxane and 0.05 cc. $BF_3$-dibutyl ether complex compound as catalyst.

The polymer obtained was treated in a kneader first with water containing a little potassium hydroxide, then with pure water until the reaction was neutral, and finally with methanol. In order to remove the methanol the polymer powder was dried at 70° C. in a vacuum drier.

13 grams of the dried polymer powder were dissolved in 100 grams of trioxane. The viscous solution obtained was polymerized with 10 milligrams of para-nitrophenyldiazonium fluoborate as catalyst. The copolymer obtained was ground and hydrolyzed in an alkaline medium as described in Example 7. The total loss of crude polymer in the alkaline degradation was 19%. In the thermal degradation (as described in Example 7) the product lost 0.01% of its weight per minute.

We claim:

1. In a process for the copolymerization of trioxane with a co-reactant in the presence of a polymerization catalyst, the improvement wherein from one-third to 2000 molar parts of trioxane are copolymerized at a temperature of from about −100° C. to about 150° C. with one molar part of a pre-formed linear polymer soluble in trioxane and consisting essentially of the recurrent unit $$-[OA(OCH_2)_m]-$$

where $m$ is a whole number from 1 to 20 and A is a bivalent hydrocarbon radical having at least six carbon atoms.

2. A process as in claim 1 wherein copolymerization is initiated by mixing said pre-formed linear polymer and said polymerization catalyst with trioxane.

3. A process as in claim 1 wherein copolymerization is initiated by adding said polymerization catalyst to a catalyst-free mixture of said pre-formed linear polymer and trioxane.

4. A process as in claim 1 wherein trioxane and said pre-formed linear polymer are first admixed, then cooled to a temperature below the melting point of the mixture, contacted with gaseous boron trifluoride, and then copolymerized at a temperature above the melting point of trioxane.

References Cited by the Examiner

UNITED STATES PATENTS

| | | | |
|---|---|---|---|
| 2,394,910 | 2/1946 | Gresham | 260—67 |
| 2,844,561 | 7/1958 | Bechtold et al. | 260—67 |
| 3,027,352 | 3/1962 | Walling et al. | 260—67 |

FOREIGN PATENTS

| | | |
|---|---|---|
| 218,743 | 12/1961 | Austria. |
| 582,945 | 9/1959 | Canada. |
| 1,263,162 | 4/1961 | France. |
| 878,163 | 9/1961 | Great Britain. |

WILLIAM H. SHORT, *Primary Examiner.*

L. M. MILLER, *Examiner.*

H. D. ANDERSON, *Assistant Examiner.*